(12) United States Patent
Suzuki et al.

(10) Patent No.: US 9,882,737 B2
(45) Date of Patent: Jan. 30, 2018

(54) NETWORK SYSTEM

(75) Inventors: Jun Suzuki, Tokyo (JP); Youichi Hidaka, Tokyo (JP); Junichi Higuchi, Tokyo (JP); Takashi Yoshikawa, Tokyo (JP); Teruyuki Baba, Tokyo (JP); Nobuharu Kami, Tokyo (JP)

(73) Assignee: NEC CORPORATION, Tokyo (JP)

(*) Notice: Subject to any disclaimer, the term of this patent is extended or adjusted under 35 U.S.C. 154(b) by 808 days.

(21) Appl. No.: 14/003,518

(22) PCT Filed: Jan. 19, 2012

(86) PCT No.: PCT/JP2012/000299
§ 371 (c)(1),
(2), (4) Date: Nov. 13, 2013

(87) PCT Pub. No.: WO2012/120761
PCT Pub. Date: Sep. 13, 2012

(65) Prior Publication Data
US 2014/0059250 A1 Feb. 27, 2014

(30) Foreign Application Priority Data
Mar. 9, 2011 (JP) ................................. 2011-051098

(51) Int. Cl.
*H04L 12/40* (2006.01)
*H04L 12/26* (2006.01)
*G06F 13/38* (2006.01)

(52) U.S. Cl.
CPC ............ *H04L 12/40* (2013.01); *G06F 13/385* (2013.01); *H04L 43/0817* (2013.01); *G06F 2213/0026* (2013.01); *G06F 2213/3808* (2013.01)

(58) Field of Classification Search
CPC . H04L 12/2602; H04L 1/0025; H04L 5/0032; H04L 5/0044; H04L 5/0053;
(Continued)

(56) References Cited

U.S. PATENT DOCUMENTS 8,122,285 B2 * 2/2012 Yagi .............................. 714/4.5
8,199,753 B2 6/2012 Mehta et al.
(Continued)

FOREIGN PATENT DOCUMENTS

CN 101836229 A 9/2010
CN 101909001 A 12/2010
(Continued)

OTHER PUBLICATIONS

Distinguish control data from encapsulated transmission data—Google Search, Jan. 5, 2017.*
(Continued)

*Primary Examiner* — Patrice Winder
*Assistant Examiner* — Ruth Solomon

(57) ABSTRACT

A network system of the present invention includes a computer and a device connected via a network, and a system management device. The computer and the device include, respectively, bridges that encapsulate transmission/reception data transmitted and received to and from each other and transmit and receive the data to and from each other via the network. Each of the bridges includes a control data transmitting means for generating control data for controlling the state of the system based on control auxiliary data issued from the computer or the device and used for controlling the state of the system, and transmitting the control data to the system management device via the network. The system management device includes a system controlling means for controlling the state of the system in accordance with the control data received thereby.

10 Claims, 9 Drawing Sheets

(58) Field of Classification Search
CPC .............. H04L 43/0817; H04L 12/40; G06F 2213/0026; G06F 13/385; G06F 2213/3808; H04W 4/20
USPC ........................................................ 709/253
See application file for complete search history.

(56) References Cited

U.S. PATENT DOCUMENTS

| | | | | |
|---|---|---|---|---|
| 8,990,468 | B2* | 3/2015 | Suzuki | G06F 13/4081 710/301 |
| 2005/0053001 | A1* | 3/2005 | Jones | H04L 12/2854 370/235 |
| 2005/0193227 | A1 | 9/2005 | Nakahara et al. | |
| 2008/0028174 | A1* | 1/2008 | Nguyen | G06F 3/0605 711/166 |
| 2010/0166017 | A1* | 7/2010 | Na | H04L 12/4633 370/474 |
| 2010/0257302 | A1* | 10/2010 | Suzuki | G06F 13/4027 710/314 |
| 2010/0309912 | A1* | 12/2010 | Mehta | H04L 12/4625 370/390 |
| 2010/0332212 | A1* | 12/2010 | Finkelman | 703/23 |
| 2011/0026917 | A1* | 2/2011 | Li | H04W 76/028 398/1 |
| 2011/0072182 | A1 | 3/2011 | Suzuki | |
| 2011/0219164 | A1* | 9/2011 | Suzuki | G06F 13/12 710/316 |
| 2011/0310904 | A1* | 12/2011 | Gero | H04L 12/4625 370/401 |
| 2012/0170578 | A1* | 7/2012 | Anumala | H04L 12/1886 370/390 |

FOREIGN PATENT DOCUMENTS

| | | | | |
|---|---|---|---|---|
| JP | 2003-296154 A | 10/2003 | | |
| JP | 2005-234917 A | 9/2005 | | |
| JP | 2007-219873 A | 8/2007 | | |
| WO | WO 2009025381 A1 * | 2/2009 | | G06F 13/12 |
| WO | 2009145098 A1 | 12/2009 | | |
| WO | WO 2009145098 A1 * | 12/2009 | | G06F 13/4081 |

OTHER PUBLICATIONS

Chinese Office Action for CN Application No. 201280012373.X dated Jun. 3, 2015 with English Translation.
The Extended European Search Report for EP Application No. EP12755620.7 dated Jan. 23, 2015.
International Search Report for PCT Application No. PCT/JP2012/000299 dated Apr. 17, 2012.
Chinese Office Action for CN Application No. 201280012373.X dated Aug. 1, 2016 with English Translation.

* cited by examiner

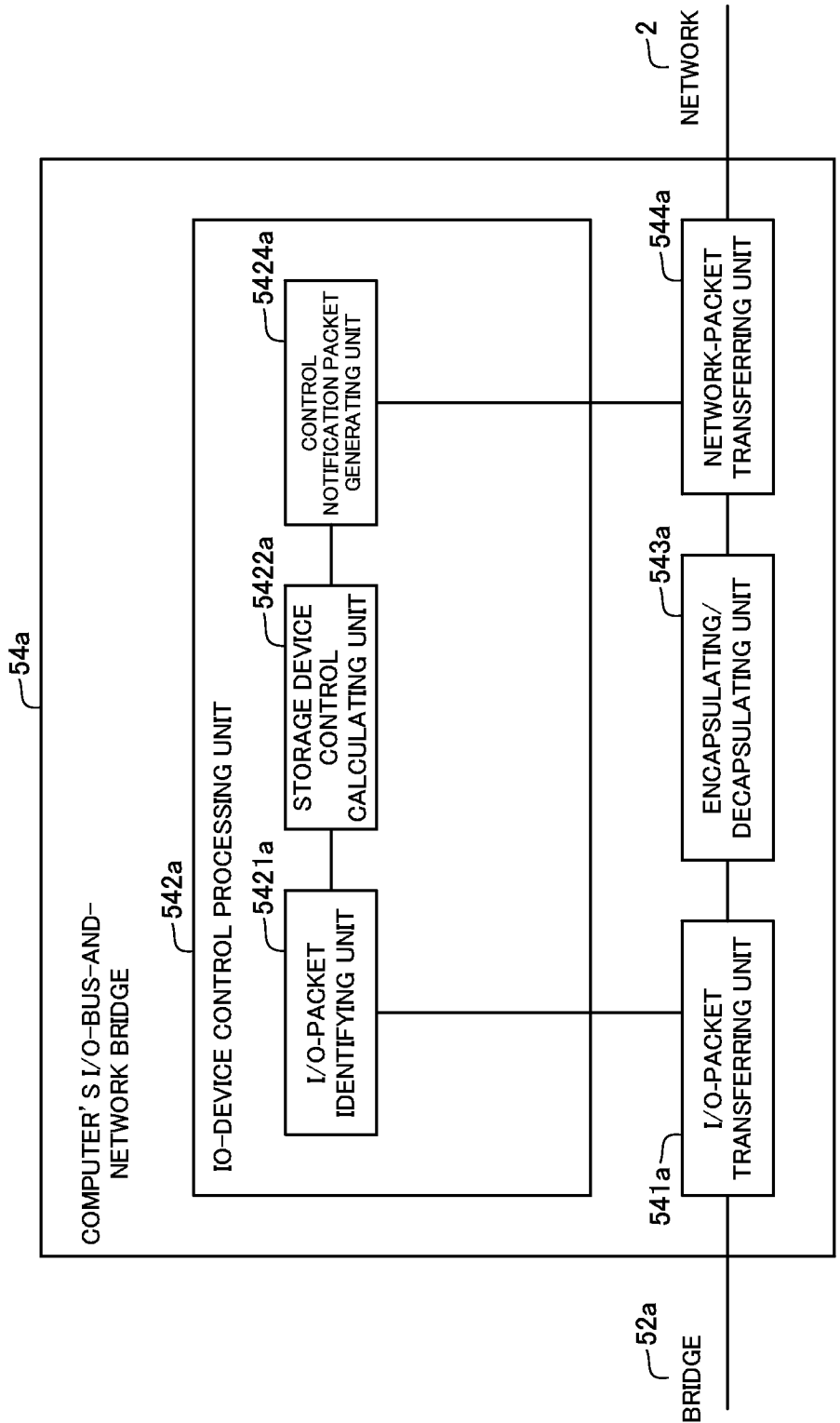

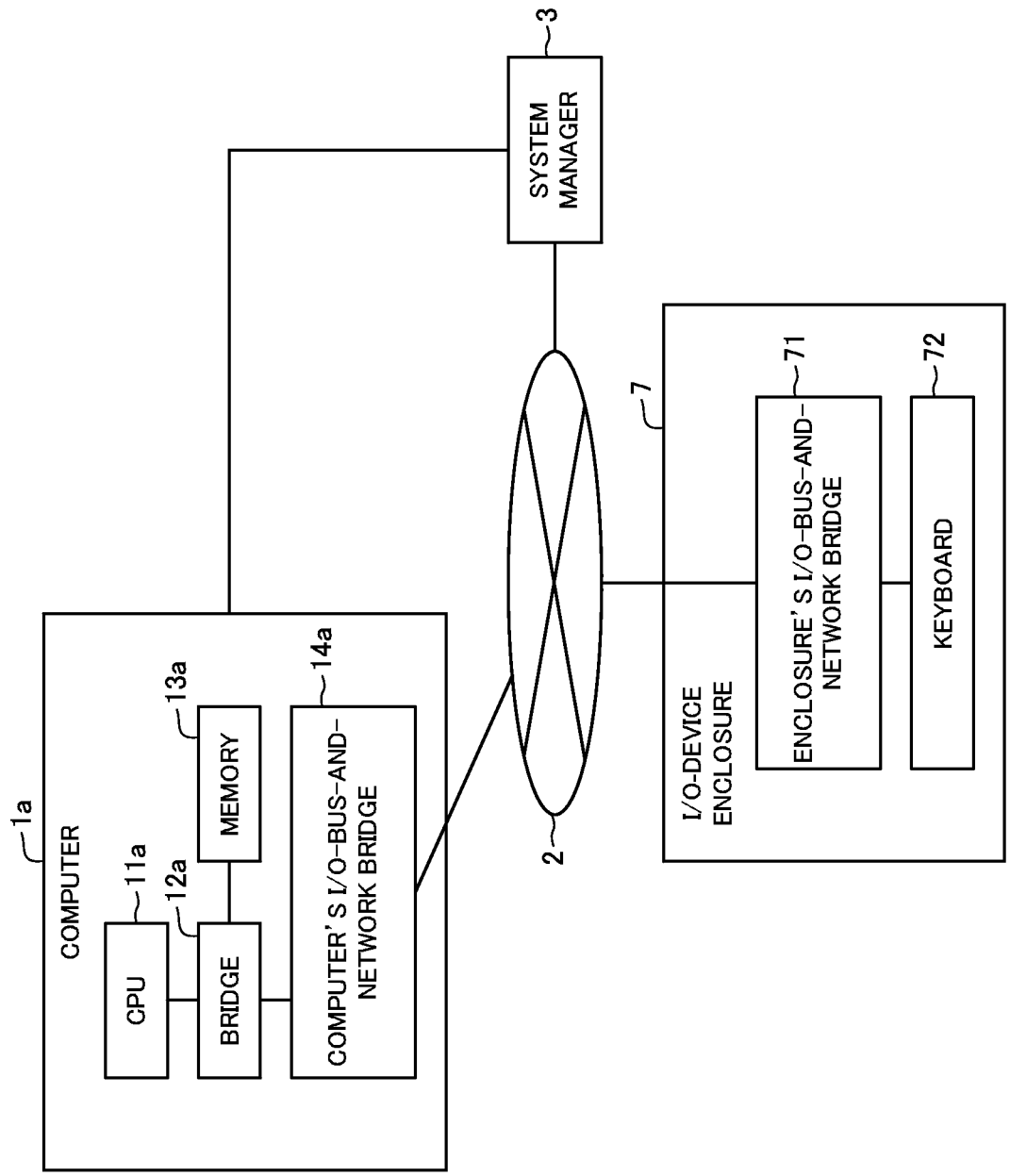

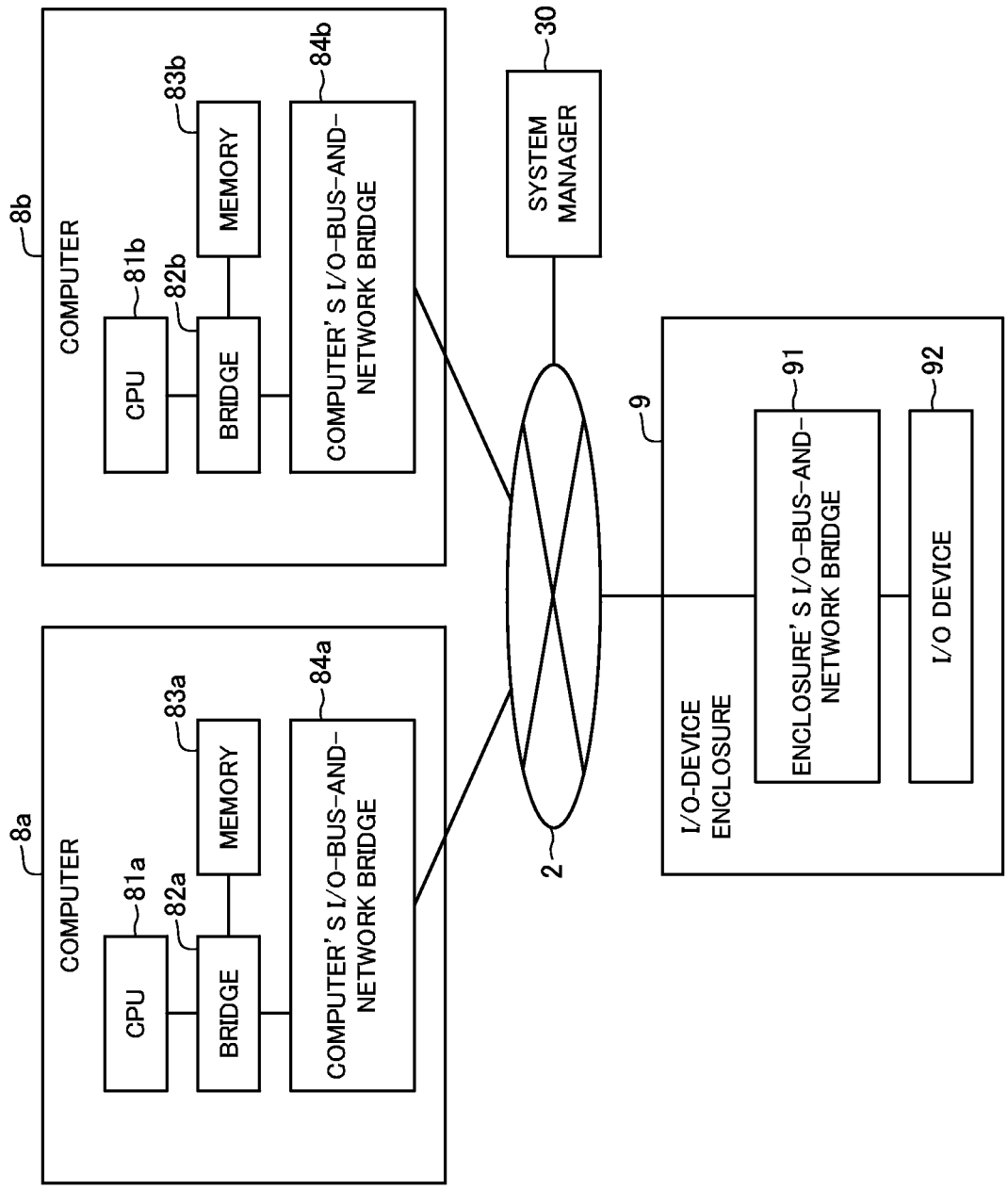

NETWORK SYSTEM

This application is a National Stage Entry of PCT/JP2012/000299 filed Jan. 19, 2012, which claims priority from Japanese Patent Application 2011-051098 filed Mar. 9, 2011, the contents of all of which are incorporated herein by reference, in their entirety.

TECHNICAL FIELD

The present invention relates to a network system, more specifically, relates to a network system in which a computer and a device capable of mutually transmitting and receiving data are connected via a network.

BACKGROUND ART

An I/O-bus network expansion system is disclosed in Patent Document 1. As shown in FIG. 9, this I/O-bus network expansion system includes computers $8a$ and $8b$, a system manager 30 and an IO-device enclosure 9 that are connected via a network 2.

The computer $8a$ includes a CPU $81a$ that runs a program, a memory $83a$ that holds the program and data, a computer's I/O-bus-and-network bridge $84a$ that encapsulates an I/O packet into a network packet and transmitting to or receiving from the network 2, and a bridge $82a$ that connects the CPU $81a$, the memory $83a$ and the computer's I/O-bus-and-network bridge $84a$ with each other. The bridge $82a$ and the computer's I/O-bus-and-network bridge $84a$ are connected by an I/O bus.

The computer $8b$ has the same configuration as the computer $8a$ described above, and has the same components $81b$ to $84b$ as the components $81a$ to $84a$ described above. Therefore, a detailed description of the components $81b$ to $84b$ will be omitted.

The network 2 transmits a network packet in which an I/O packet is encapsulated, to a target node. For example, the network 2 transmits a network packet from the computer $8a$ to an I/O device 92 or from the I/O device 92 to the computer $8a$.

The IO-device enclosure 9 includes an enclosure's I/O-bus-and-network bridge 91 that encapsulates an I/O packet into a network packet and transmitting to or receiving from the network 2, and the I/O device 92. The enclosure's I/O-bus-and-network bridge 91 and the I/O device 92 are connected by an I/O bus. The I/O device 92 is, for example, a network interface that is compliant with PCI Express (PCIe), or a combination of a storage controller and a hard disk.

The system manager 30 controls allocation of the I/O device 92 between the computer $8a$ and the computer $8b$. To be specific, the system manager 30 issues a control packet to the enclosure's I/O-bus-and-network bridge 91 and thereby changes a computer to which the I/O device 92 is allocated. A case of changing a destination of allocation of the I/O device 92 from the computer $8a$ to the computer $8b$ will be considered as an example. In this case, the system manager 30 issues a control packet to the enclosure's I/O-bus-and-network bridge 91, and thereby, the enclosure's I/O-bus-and-network bridge 91 terminates connection with the computer's I/O-bus-and-network bridge $84a$ of the computer $8a$ and newly establishes connection with the computer's I/O-bus-and-network bridge $84b$ of the computer $8b$.

The I/O-bus network expansion system having the abovementioned configuration operates in the following manner. Below, a case in which the I/O device 92 is allocated to the computer $8a$ will be described.

First, a case of transmitting an I/O packet from the computer $8a$ to the I/O device 92 will be described. Such communication occurs when the program running on the CPU $81a$ accesses the I/O device 92, or when the I/O device 92 retrieves data from the memory $83a$ by DMA (Direct Memory Access). At this moment, the bridge $82a$ issues an I/O packet for the I/O device 92.

Then, the computer's I/O-bus-and-network bridge $84a$ encapsulates the received I/O packet into a network packet, and transmits this network packet to the network 2 with the network address of the enclosure's I/O-bus-and-network bridge 91 as a destination. The network 2 transmits the network packet that the I/O packet is encapsulated, to the enclosure's I/O-bus-and-network bridge 91. Then, the enclosure's I/O-bus-and-network bridge 91 receives and decapsulates the network packet that the I/O packet is encapsulated, and transmits the I/O packet to the I/O device 92.

Also in an operation of transmitting an I/O packet from the I/O device 92 to the computer $8a$, the I/O packet is encapsulated into a network packet in the same manner as in the operation of transmitting an I/O packet from the computer $8a$ to the I/O device 92. Then, the I/O packet received by the bridge $82a$ is transmitted to the CPU $81a$, or transmitted to the memory $83a$ by DMA.

While the I/O device 92 is allocated to the computer $8a$ as described above, an access from the computer $8b$ to the I/O device 92 does not occur.

Patent Document 1: Japanese Unexamined Patent Application Publication No. 2007-219873

However, the network expansion system having the abovementioned configuration has the following problems. A first problem is that the I/O device 92 cannot be controlled from the computer $8a$ or $8b$. This is because a network packet transmitted from the computer $8a$, $8b$ is a network packet in which an I/O packet is encapsulated and it is therefore impossible to 15 perform I/O-device control that is not defined in the I/O packet. Likewise, a second problem is that the computer cannot be controlled from the I/O device. This is because a network packet transmitted from the I/O device 92 to the computer $8a$, $8b$ is a network packet in which an I/O packet is encapsulated.

On the other hand, when controlling the I/O device from the computer or when controlling the computer from the IO-device enclosure, there is a need to connect the computer and the system manager or connect the IO-device enclosure and the system manager by a management network of another system. Consequently, there arises a problem such as a complicated configuration of the system and increase of the cost.

SUMMARY

Accordingly, an object of the present invention is to solve the abovementioned problem; it is impossible to control one from the other between a computer and an I/O device connected via a network.

In order to achieve the object, a network system of an exemplary embodiment of the present invention is a network system including a computer and a device connected via a network so as to be capable of transmitting and receiving data to and from each other, and also including, via the network, a system management device configured to control a state of a system including the computer and the device, wherein:

the computer and the device include, respectively, bridges configured to encapsulate transmission/reception data transmitted and received to and from each other and configured to transmit and receive the data to and from each other via the network;

each of the bridges includes a control data transmitting means for generating control data for controlling the state of the system based on control auxiliary data issued from the computer or the device and used for controlling the state of the system, and transmitting the control data to the system management device via the network; and the system management device includes a system controlling means for controlling the state of the system in accordance with the control data received thereby.

Further, a computer of another exemplary embodiment of the present invention is a computer capable of transmitting and receiving data to and from a device connected thereto via a network, the computer including a bridge configured to encapsulate transmission/reception data transmitted and received to and from the device, and transmit and receive the data to and from the device via the network, wherein the bridge includes a control data transmitting means for, based on control auxiliary data issued from the computer, generating control data for controlling a state of a system in which the computer and the device are connected via the network, and transmitting the control data to a system management device configured to control the state of the system via the network.

Further, a computer program of another exemplary embodiment of the present invention is a computer program including instructions for causing a computer capable of transmitting and receiving data to and from a device connected thereto via a network, to realize a bridge configured to encapsulate transmission/reception data transmitted and received to and from the device, and transmit and receive the data to and from the device via the network, the computer program including instructions for causing the computer to realize that the bridge includes a control data transmitting means for, based on control auxiliary data issued from the computer, generating control data for controlling a state of a system in which the computer and the device are connected via the network, and transmitting the control data to a system management device configured to control the state of the system via the network.

Further, a network system controlling method of another exemplary embodiment of the present invention includes, by a bridge included in a computer capable of transmitting and receiving data to and from a device connected thereto via a network:

encapsulating transmission/reception data transmitted and received to and from the device, and transmitting and receiving the data to and from the device via the network; and based on control auxiliary data issued from the computer, generating control data for controlling a state of a system in which the computer and the device are connected via the network, and transmitting the control data to a system management device configured to control the state of the system via the network.

Further, a device of another exemplary embodiment of the present invention is a device capable of transmitting and receiving data to and from a computer connected thereto via a network, the device including a bridge configured to encapsulate transmission/reception data transmitted and received to and from the computer, and transmit and receive the data to and from the computer via the network, wherein the bridge includes a control data transmitting means for, based on control auxiliary data issued from the device, generating control data for controlling a state of a system in which the device and the computer are connected via the network, and transmitting the control data to a system management device configured to control the state of the system via the network.

Further, a computer program of another exemplary embodiment of the present invention is a computer program including instructions for causing a device capable of transmitting and receiving data to and from a computer connected thereto via a network, to realize a bridge configured to encapsulate transmission/reception data transmitted and received to and from the computer, and transmit and receive the data to and from the device via the network, the computer program including instructions for causing the device to realize that the bridge includes a control data transmitting means for, based on control auxiliary data issued from the device, generating control data for controlling a state of a system in which the device and the computer are connected via the network, and transmitting the control data to a system management device configured to control the state of the system via the network.

Further, a network system controlling method of another exemplary embodiment of the present invention includes, by a bridge included in a device capable of transmitting and receiving data to and from a computer connected thereto via a network:

encapsulating transmission/reception data transmitted and received to and from the computer, and transmitting and receiving the data to and from the computer via the network; and based on control auxiliary data issued from the device, generating control data for controlling a state of a system in which the device and the computer are connected via the network, and transmitting the control data to a system management device configured to control the state of the system via the network.

Further, a network system controlling method of another exemplary embodiment of the present invention is a network system controlling method in a network system that includes a computer and a device connected via a network so as to be capable of transmitting and receiving data to and from each other and also includes, via the network, a system management device configured to control a state of a system including the computer and the device, the network controlling method including:

by respective bridges included in the computer and the device: encapsulating transmission/reception data transmitted and received to and from each other, and transmitting and receiving the data to and from each other via the network; and generating control data for controlling the state of the system based on control auxiliary data issued from the computer or the device and used for controlling the state of the system, and transmitting the control data to the system management device via the network; and by the system management device, controlling the state of the system in accordance with the control data received thereby.

With the configurations as described above, the present invention can realize controlling one from the other between a computer and an I/O device connected via a network, while limiting a complicated configuration of the system and increase of the cost.

BRIEF DESCRIPTION OF DRAWINGS

FIG. 7 is a function block diagram showing the configuration of a computer's I/O-bus-and-network bridge disclosed in FIG. 6;

FIG. 8 is a block diagram showing the configuration of a network system in a third exemplary embodiment of the present invention; and FIG. 9 is a block diagram showing the configuration of another network system relating to the present invention.

EXEMPLARY EMBODIMENTS

Figure 1:
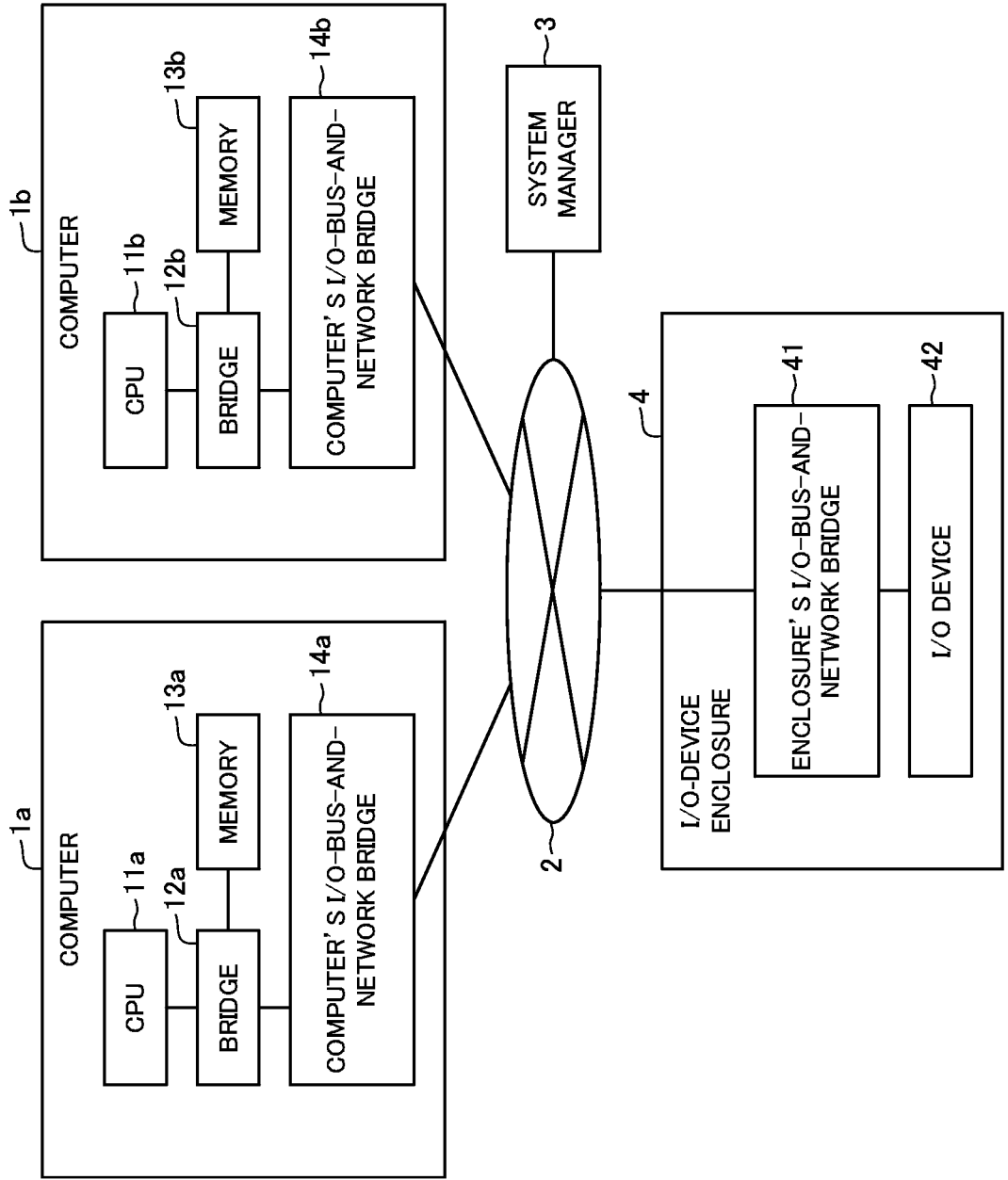
FIG. 1 is a block diagram showing the configuration of a network system in a first exemplary embodiment of the present invention.
Figure 2:
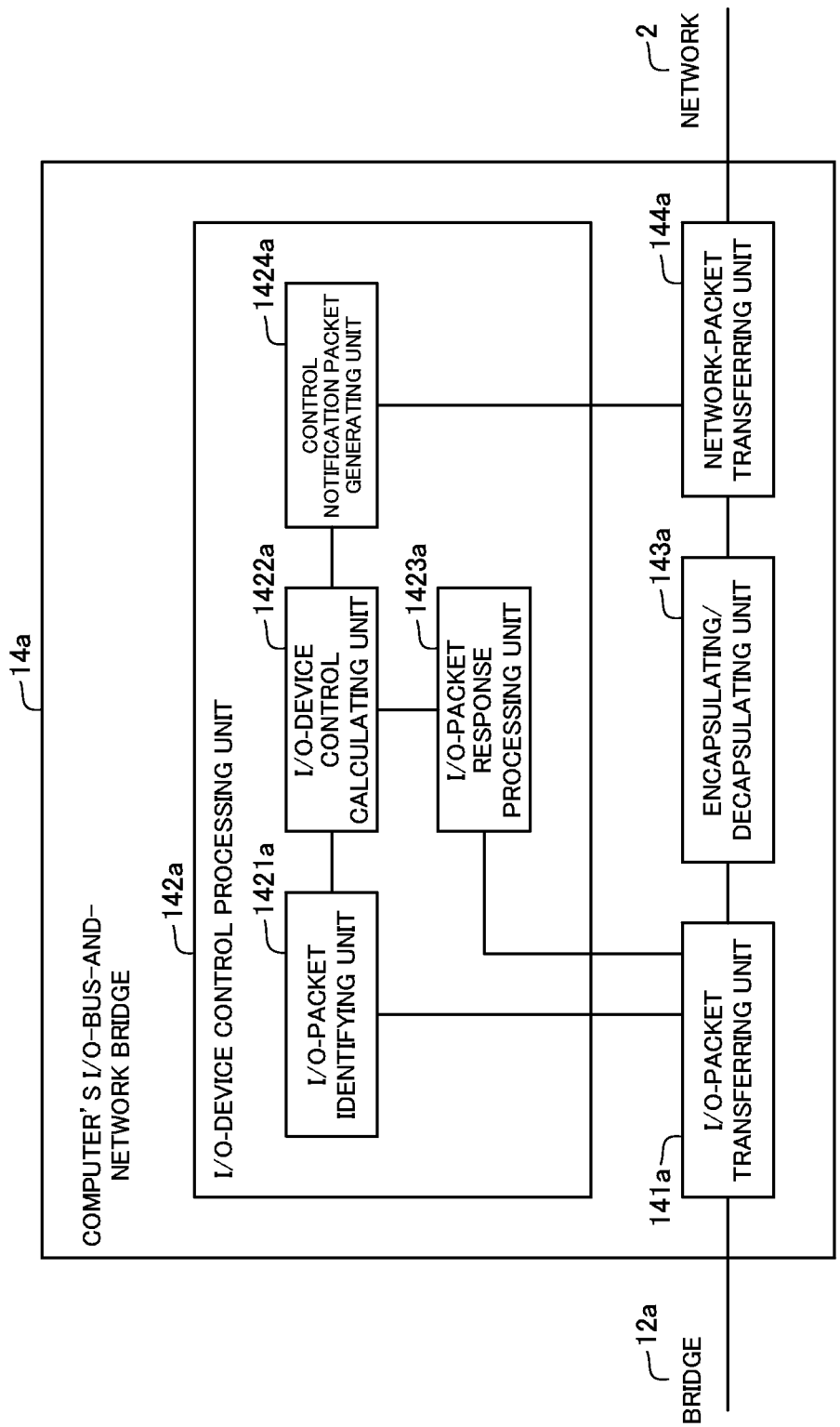
FIG. 2 is a function block diagram showing the configuration of a computer's I/O-bus-and-network bridge disclosed in FIG. 1.
Figure 3:
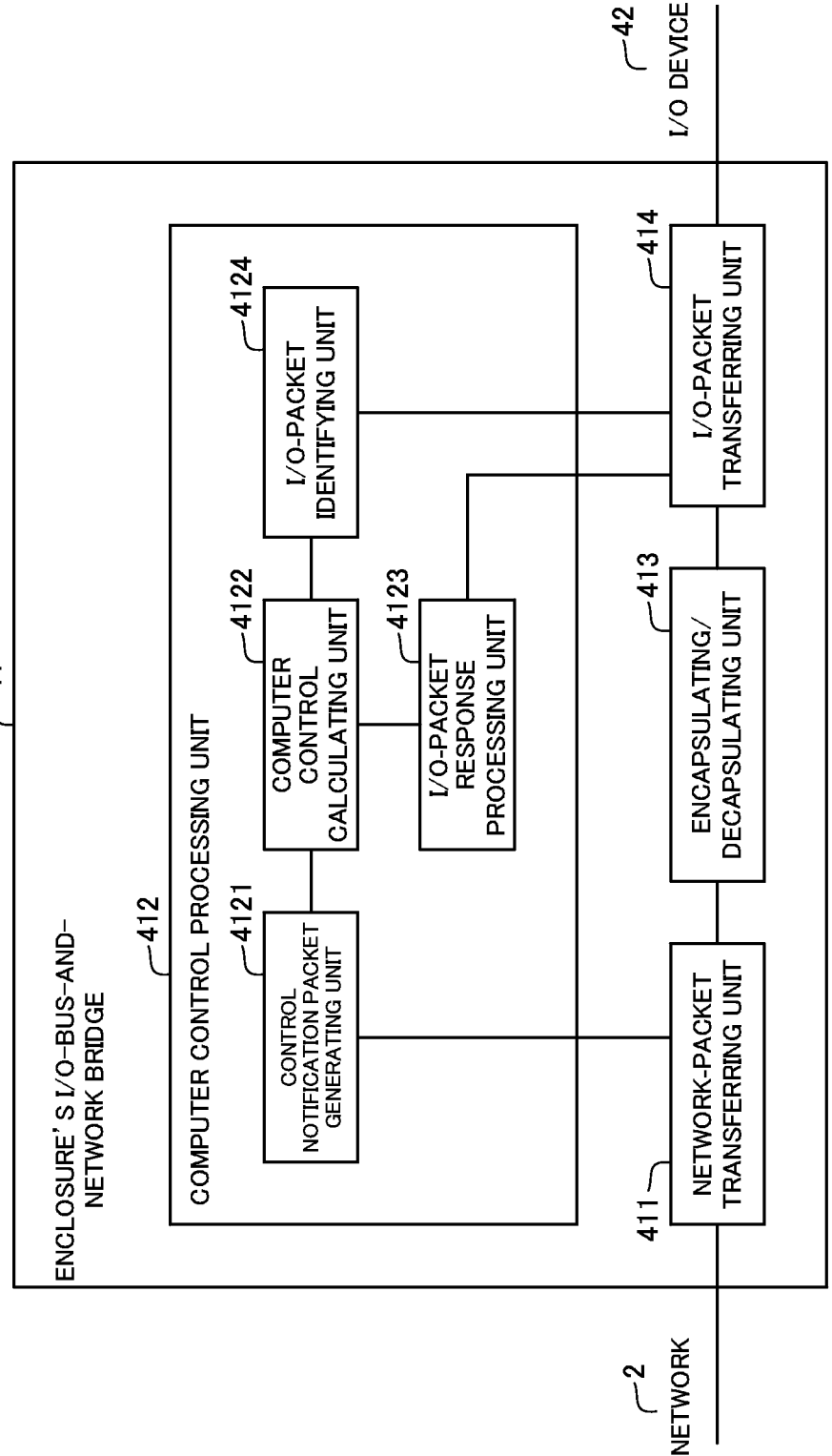
FIG. 3 is a function block diagram showing the configuration of an enclosure's I/O-bus-and-network bridge disclosed in FIG. 1.
Figure 4:
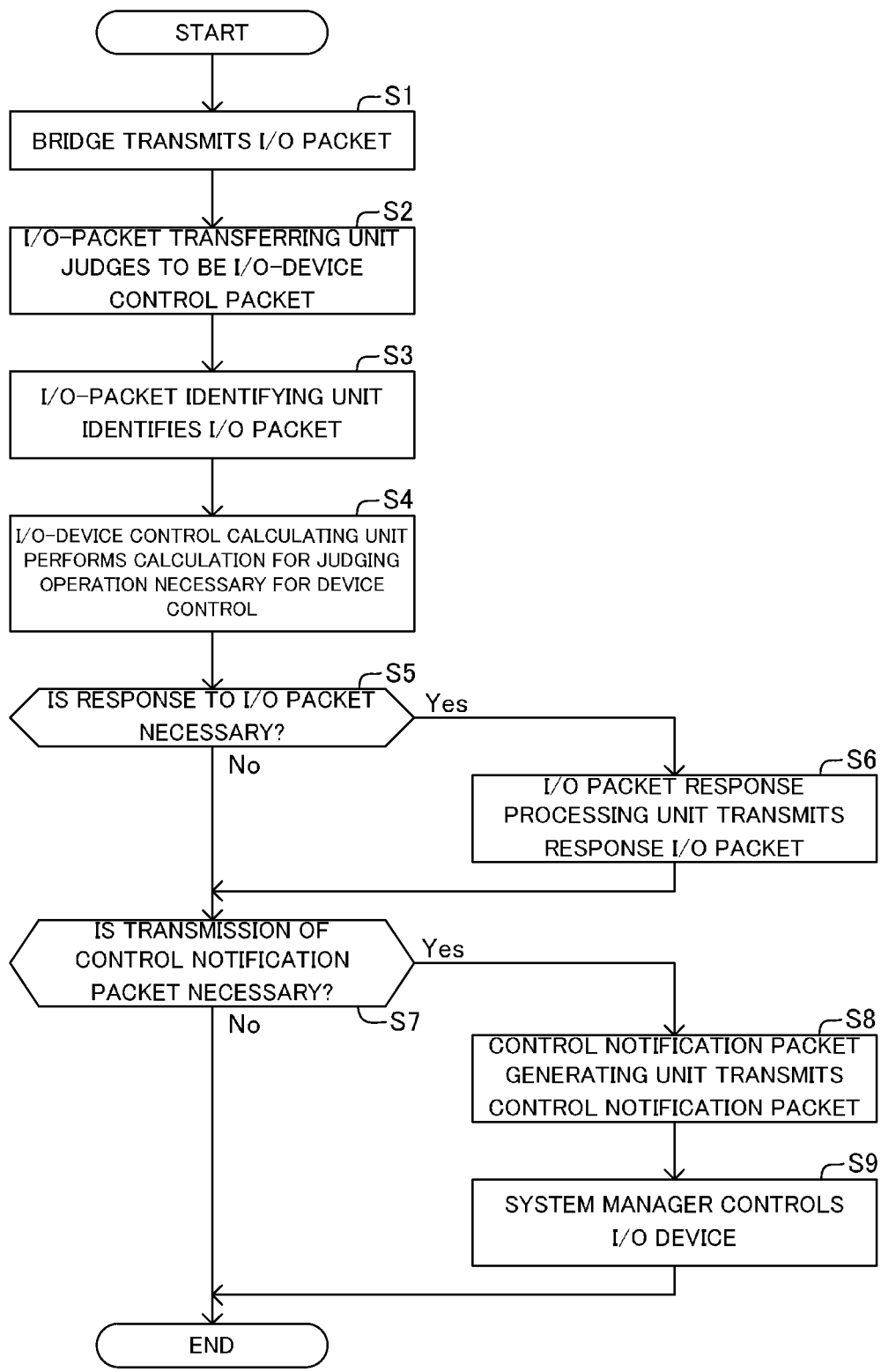
FIG. 4 is a flowchart showing the operation of the network system disclosed in FIG. 1.
Figure 5:
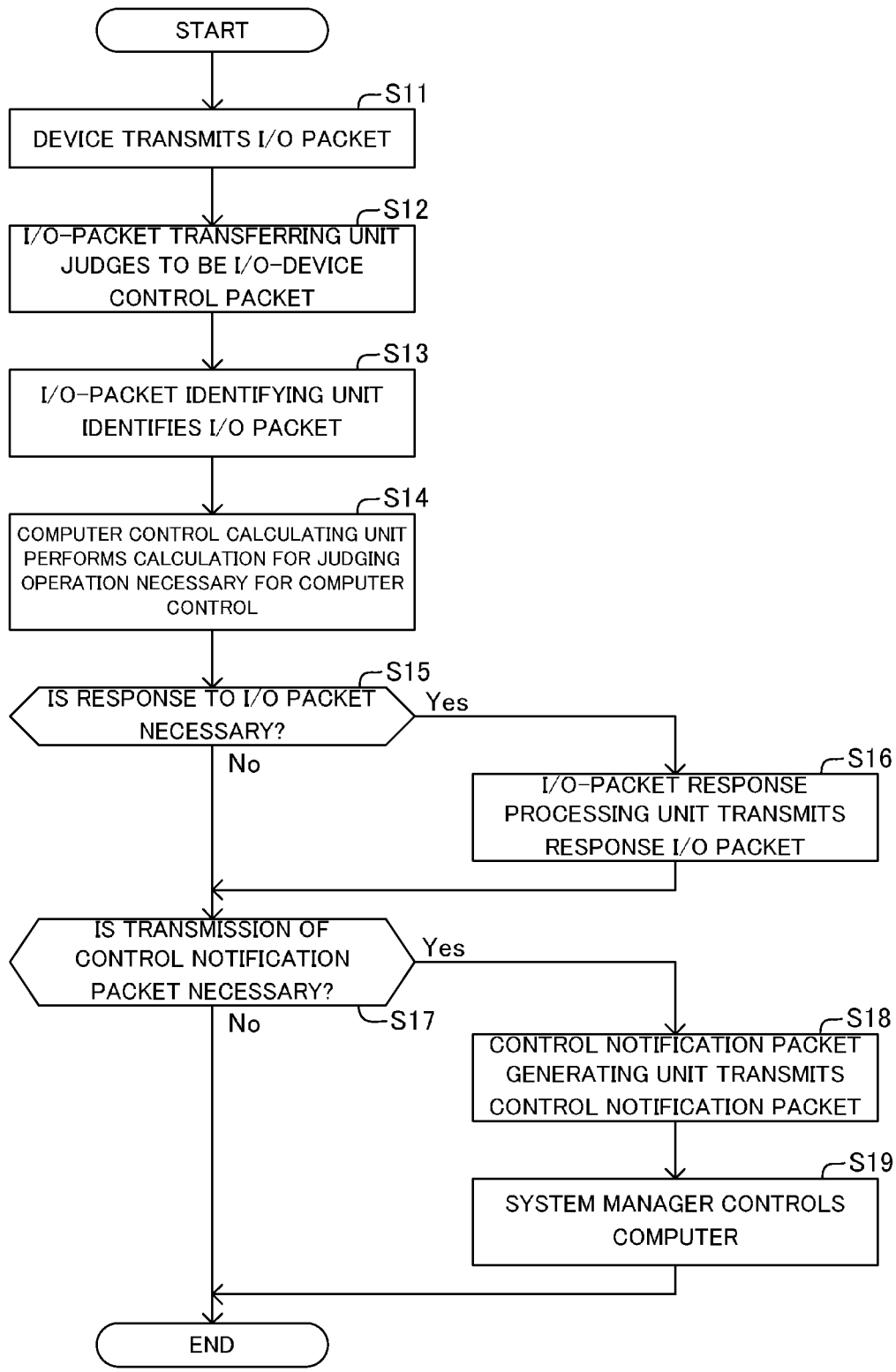
FIG. 5 is a flowchart showing the operation of the network system disclosed in FIG. 1.

A first exemplary embodiment of the present invention will be described with reference to FIGS. 1 to 5. FIGS. 1 to 3 are diagrams for describing the configuration of a network expansion system according to the present invention, and FIGS. 4 and 5 are views for describing the operation thereof.

[Configuration]

As shown in FIG. 1, a network expansion system (a network system) in the first exemplary embodiment of the present invention includes two computers 1a and 1b, a system manager 3, and an TO-device enclosure 4, which are connected via a network 2.

The computer 1a includes a CPU 11a that runs a program, a memory 13a that holds the program and data, a computer's I/O-bus-and-network bridge 14a that encapsulates an I/O packet into a network packet and transmits to or receives from the network 2, and a bridge 12a that connects the CPU 11a, the memory 13a and the computer's I/O-bus-and-network bridge 14a to each other. The bridge 12a and the computer's I/O-bus-and-network bridge 14a are connected by an I/O bus.

The computer 1b has the same configuration as the computer 1a described above, and has the same components 11b to 14b as the components 11a to 14a described above. Therefore, a detailed description of the components 11b to 14b will be omitted. Although this exemplary embodiment describes a case in which the network expansion system includes the two computers 1a and 1b, a network expansion system according to the present invention may include three or more computers, the number of which is not limited.

The IO-device enclosure 4 (a device) includes an enclosure's I/O-bus-and-network bridge 41 that encapsulates an I/O packet into a network packet and transmits to or receives from the network 2, and an I/O device 42. The enclosure's I/O-bus-and-network bridge 41 and the I/O device 42 are connected by an I/O bus. Therefore, the IO-device enclosure 4 including the I/O device 42 and the enclosure's I/O-bus-and-network bridge 41 connected by the I/O bus configures a unified device.

The I/O device 42 is, for example, a network interface compliant with PCI Express (PCIe), or a combination of a storage controller and a hard disk. Accordingly, I/O packets transmitted and received between the computer 1a, 1b and the I/O device 42 as described below are I/O packets compliant with PCI Express.

In this exemplary embodiment, it is assumed that the abovementioned I/O device 42 is allocated to the computer 1a. Below, the configurations of the computer's I/O-bus-and-network bridge 14a included by the computer 1a and the enclosure's I/O-bus-and-network bridge 41 included by the IO-device enclosure 4 will be described in detail. Because the computer 1b has the same configuration as the computer 1a, the computer's I/O-bus-and-network bridge 14b of the computer 1b has the same configuration as that of the computer 1a.

As shown in FIG. 2, the computer's I/O-bus-and-network bridge 14a (a bridge) includes an I/O-packet transferring unit 141a, an I/O-device control processing unit 142a, an encapsulating/decapsulating unit 143a, and a network-packet transferring unit 144a. In a case that the computer 1a transmits an I/O packet to the I/O device 42, the I/O-packet transferring unit 141a (a data discriminating means) receives an I/O packet issued by the bridge 12a and, when the I/O-packet transferring unit 141a judges that the received I/O packet is a transfer packet (transmission/reception data) to be transferred to the I/O device 42, transfers this I/O packet to the encapsulating/decapsulating unit 143a.

An I/O packet issued by the bridge 12a is either a transfer packet (transmission/reception data) transmitted to the I/O device 42 or an I/O-device control packet (control auxiliary data) issued for determining whether to control the state of the I/O device 42, that is, the state of the system (described later). Thus, when a received I/O packet is a transfer packet, the I/O-packet transferring unit 141a passes the I/O packet to the encapsulating/decapsulating unit 143a. On the other hand, when a received I/O packet is an I/O-device control packet, the I/O-packet transferring unit 141a passes the I/O packet to an I/O-packet identifying unit 1421a included by the I/O-device control processing unit 142a (described later).

The I/O-packet transferring unit 141a judges whether a received I/O packet is a transfer packet or an I/O-device control packet by the following method, for example. At first, the computer's I/O-bus-and-network bridge 14a is mapped on a memory space of the computer 1a. The I/O-packet transferring unit 141a judges a packet for a specific memory of the computer's I/O-bus-and-network bridge 14a to be an I/O-device control packet, and judges other packets to be transfer packets. Alternatively, the I/O-packet transferring unit 141a judges whether a received packet is an I/O-device control packet or a transfer packet depending on the value of a predetermined specific region of an I/O packet. However, the method for identifying an I/O packet is not limited to the abovementioned methods.

The encapsulating/decapsulating unit 143a (an encapsulating/decapsulating means) encapsulates an I/O packet (a transfer packet) transferred from the I/O-packet transferring unit 141a into a network packet, and passes to the network-packet transferring unit 144a. Then, the network-packet transferring unit 144a transmits the network packet to the network 2 with a network address of the enclosure's I/O-bus-and-network bridge 41 as a destination.

The network 2 transmits a network packet with an I/O packet encapsulated to a target node. For example, as described above, the network 2 transmits a network packet transmitted from the computer 1a to the enclosure's I/O-bus-and-network bridge 41 of the IO-device enclosure 4. Conversely, the network 2 transmits a network packet transmitted from the enclosure's I/O-bus-and-network bridge 41 of the IO-device enclosure 4, to the computer's I/O-bus-and-network bridge 14a of the computer 1a.

The network-packet transferring unit 144a, the encapsulating/decapsulating unit 143a and the I/O-packet transferring unit 141a described above execute the opposite processes to the abovementioned processes, respectively, on a network packet in which an I/O packet (a transfer packet) transmitted from the I/O device 42 via the network 2 is encapsulated. To be specific, when the network-packet transferring unit 144a receives a network packet from the network 2, the encapsulating/decapsulating unit 143a performs decapsulation, which is termination of encapsulation of the network packet. Then, the I/O-packet transferring unit 141a passes the decapsulated I/O packet (a transfer packet) to the CPU 11a or the memory 13a via the bridge 12a.

The I/O-device control processing unit 142a of the computer's I/O-bus-and-network bridge 14a includes, as shown in FIG. 2, an I/O-packet identifying unit 1421a that identifies a received I/O packet, an I/O-device control calculating unit 1422a that executes an I/O control process corresponding to a received I/O packet, an I/O-packet response processing unit 1423a that generates and transmits a response packet responding to an I/O packet received from the program running on the computer 1a, and a control notification packet generating unit 1424a that executes an I/O control process corresponding to the result of calculation on a received I/O packet.

The I/O-packet identifying unit 1421a (a control content identifying unit) receives an I/O-device control packet, which is an I/O packet judged to be an I/O-device control packet (control auxiliary data) issued for determining whether to control the state of the system by the CPU 11 as described above. Then, the I/O-packet identifying unit identifies the type of a control of the I/O device designated by the received I/O packet, and notifies to the I/O-device control calculating unit 1422a.

The I/O-device control calculating unit 1422a (a control judging unit) uses the received I/O-device control packet (control auxiliary data) to perform a calculation for judging whether to perform an operation necessary for control of the I/O device 42. When a response to the received I/O packet is necessary, the I/O-device control calculating unit 1422a notifies to the I/O-packet response processing unit 1423a.

The I/O-packet response processing unit 1423a (a response data transmitting unit) receives notification of the calculation result from the I/O-device control calculating unit 1422a as described above, and transmits a response I/O packet to the program running on the CPU 11a via the I/O-packet transferring unit 141a.

Further, when the I/O-device control calculating unit 1422a performs the calculation for judging whether to perform an operation for control of the I/O device 42 based on the I/O-device control packet (control auxiliary data) issued by the computer 1a and, consequently, judges that it is necessary to control the I/O device 42, the I/O-device control calculating unit 1422a notifies that to the control notification packet generating unit 1424a.

The control notification packet generating unit 1424a (a control data generating unit) generates a control notification packet, which is information for controlling the state of the system, that is, the state of the I/O device 42, and transmits the control notification packet to the system manager 3 via the network-packet transferring unit 144a.

The system manager 3 (a system management device) receives the control notification packet from the computer's I/O-bus-and-network bridge 14a, and performs control of the I/O device 42. The control of the I/O device 42 is performed by transmission of the control notification packet from the system manager 3 to the enclosure's I/O-bus-and-network bridge 41.

The control of the I/O device 42 includes, for example, switching allocation of the I/O device 42 from the computer 1a to the computer 1b, resetting the I/O device 42, and changing the operation mode of the I/O device 42. However, the control of the I/O device 42 is not limited to the above.

Next, with reference to FIG. 3, the configuration of the enclosure's I/O-bus-and-network bridge 41 will be described. The enclosure's I/O-bus-and-network bridge 41 includes a network-packet transferring unit 411 that transfers a network packet, a computer control processing unit 412 that performs control of the computer 1a, an encapsulating/decapsulating unit 413 that executes a process of encapsulating an I/O packet into a network packet and decapsulating, and an I/O-packet transferring unit 414 that transfers an I/O packet.

Further, the computer control processing unit 412 includes an I/O-packet identifying unit 4124 that identifies a received I/O packet, a computer control calculating unit 4122 that judges whether to execute a computer control process depending on a received I/O packet, an I/O-packet response processing unit 4123 that generates a response packet responding to a received I/O packet and transmitting to the I/O device 42, and a control notification packet generating unit 4121 generating and transmitting a network packet notifying control of the computer 1a.

In transmission of an I/O packet from the I/O device 42 to the computer 1a, the I/O-packet transferring unit 414 (a data discriminating means) receives the I/O packet issued by the I/O device 42 and, when judging to be a transfer packet (transmission/reception data) to the computer 1a, the I/O-packet transferring unit 414 transfers this I/O packet to the encapsulating/decapsulating unit 413.

As in the above description, an I/O packet issued by the I/O device 42 is either a transfer packet (transmission/reception data) transmitted to the computer 1a or a computer control packet (control auxiliary data) issued for determining whether to control the state of the computer 1a. Thus, in a case that a received I/O packet is a transfer packet, the I/O-packet transferring unit 414 passes the I/O packet to the encapsulating/decapsulating unit 413. On the other hand, in a case that a received I/O packet is a computer control packet, the I/O-packet transferring unit 414 passes the I/O packet to the I/O-packet identifying unit 4124. The I/O-packet transferring unit 414 judges whether an I/O packet is a transfer packet or a computer control packet by various methods, for example, in the same manner as described above, or depending on data in an I/O packet.

The encapsulating/decapsulating unit 413 (an encapsulating/decapsulating means) encapsulates an I/O packet (a transfer packet) transferred from the I/O-packet transferring unit 414 into a network packet, and passes to the network-packet transferring unit 411. Then, the network-packet transferring unit 411 transmits the network packet to the network 2 with the network address of the computer's I/O-bus-and-network bridge 14a as a destination.

The network-packet transferring unit 411, the encapsulating/decapsulating unit 413 and the I/O-packet transferring unit 414 described above execute the opposite processes to the abovementioned processes, respectively. When the network-packet transferring unit 411 receives a network packet from the network 2, the encapsulating/decapsulating unit 413 performs decapsulation, which is termination of encapsulation of the network packet. The I/O-packet transferring unit 414 passes the decapsulated I/O packet (a transfer packet) to the I/O device 42.

The I/O-packet identifying unit 4121 (a control content identifying unit) receives an I/O packet that the I/O-packet transferring unit 414 has judged to be a computer control packet (control auxiliary data) issued for determining whether to control the state of the system as described above. Then, the I/O-packet identifying unit 4121 identifies the type of control of the I/O device designated by the received I/O packet, and notifies to the computer control calculating unit 4122.

The I/O-device control calculating unit 4122 (a control judging unit) uses the received I/O-device control packet (control auxiliary data) to perform a calculation for judging whether to perform an operation necessary for control of the computer 1a. When a response to the received I/O packet is required, the computer control calculating unit 4122 notifies to the I/O-packet response processing unit 4123.

The I/O-packet response processing unit 4123 (a response data transmitting unit) receives notification of the calculation result from the computer control calculating unit 4122 as described above, and transmits a response I/O packet via the I/O-packet transferring unit 414.

Further, when the computer control calculating unit 4122 performs the calculation for judging whether to perform an operation necessary for control of the computer 1a based on the computer control packet (control auxiliary data) issued by the I/O device 42 and, consequently, judges that it is necessary to control the computer 1a, the computer control calculating unit 4122 notifies that to the control notification packet generating unit 4121.

The control notification packet generating unit 4121 (a control data generating unit) generates a control notification packet, which is information for controlling the state of the system, that is, the state of the computer 1a, and transmits the control notification packet to the system manager 3 via the network-packet transferring unit 411.

The system manager 3 (a system management device) receives the control notification packet from the enclosure's I/O-bus-and-network bridge 41, and performs control of the computer 1a. The control of the computer 1a includes, for example, shutdown and restart of the computer 1a, but is not limited thereto.

[Operation]

Next, with reference to FIGS. 1 and 2 and a flowchart of FIG. 4, an operation of controlling the I/O device 42 from the computer 1a will be described. Although a transfer packet, which is an I/O packet transmitted and received between the computer 1a and the I/O device 42, is encapsulated to be transmitted and received as described above, the description of such an operation will be omitted.

First, the bridge 12 of the computer 1a is controlled by the program running on the CPU 11a to issue an I/O packet for controlling the I/O device 42 (step S1). When judging the received I/O packet to be an I/O-device control packet, the I/O-packet transferring unit 141a transfers to the I/O-packet identifying unit 1421a (step S2). For example, the I/O-packet transferring unit 141a judges a packet for a specific memory in the computer's I/O-bus-and-network bridge 14a to be an I/O-device control packet, or judges an I/O packet to be an I/O-device control packet depending on the value of a specific region in the I/O packet.

Next, the I/O-packet identifying unit 1421a identifies the type of control on the I/O device 42 instructed in the received I/O packet (step S3), and notifies to the I/O-device control calculating unit 1422a. The I/O-device control calculating unit 1422a performs a calculation for judging whether to perform an operation necessary for control on the I/O device 42 (step S4). When a response to the received I/O packet is required as a result of the calculation (Yes at step S5), the I/O-device control calculating unit 1422a notifies to the I/O-packet response processing unit 1423a. On receipt of this notification, the I/O-packet response processing unit 1423a transmits a response I/O packet to the program running on the CPU 11a via the I/O-packet transferring unit 141a (step S6).

On the other hand, when transmission of a control notification packet to the system manager 3 for control on the I/O device 42 is required as a result of the calculation at step S4 described above (Yes at step S7), the I/O-device control calculating unit 1422a notifies that to the control notification packet generating unit 1424a. Then, the control notification packet generating unit 1424a transmits a control notification packet to the system manager 3 via the network-packet transferring unit 144a (step S8).

Then, the system manager 3 receives the control notification packet and performs control on the I/O device 42 (step S9). The control on the I/O device 42 is performed by transmitting a control packet from the system manager 3 to the enclosure's I/O-bus-and-network bridge 41.

Next, with reference to FIGS. 1 and 3 and a flowchart of FIG. 5, an operation of controlling the computer 1a from the I/O device 42 will be described. Although a transfer packet, which is an I/O packet transmitted and received between the I/O device 42 and the computer 1a, is encapsulated to be transmitted and received as described above, the description of such an operation will be omitted.

First, the I/O device 42 issues an I/O packet for controlling the computer 1a, according to input from a keyboard or the like (step S11). Then, the I/O-packet transferring unit 414 judges the received I/O packet to be a computer control packet, and transfers to the I/O-packet identifying unit 4124 (step S12). For example, the I/O-packet transferring unit 4124 identifies a packet for a memory, in which the enclosure's I/O-bus-and-network bridge 41 is mapped on a memory space of the computer 1a, as a computer control packet, or identifies an I/O packet as a computer control packet depending on the value of a predetermined specific region in the I/O packet.

Next, the I/O-packet identifying unit 4124 identifies the type of control on the computer 1a instructed in the received I/O packet (step S13), and notifies to the computer control calculating unit 4122. The computer control calculating unit 4122 performs a calculation for judging an operation necessary for control on the computer 1a (step S14). When a response to the received I/O packet is required as a result of the calculation (Yes at step S15), the computer control calculating unit 4122 notifies to the I/O-packet response processing unit 4123. On receipt of this notification, the I/O-packet response processing unit 4123 transmits a response I/O packet to the I/O device 42 via the I/O-packet transferring unit 414 (step S16).

On the other hand, when transmission of a control notification packet to the system manager 3 for control on the computer 1a is required as a result of the calculation at step S14 described above (Yes at step S17), the computer control calculating unit 4122 notifies that to the control notification packet generating unit 4121. Then, the control notification packet generating unit 4121 transmits a control notification packet to the system manager 3 via the network-packet transferring unit 411 (step S18).

The system manager 3 receives the control notification packet and performs control on the computer 1a (step S19).

The control on the computer 1a is performed by transmitting a control packet from the system manager 3 to the computer's I/O-bus-and-network bridge 14a, or transmitting via a management network that connects the computer 1a and the system manager 3 by another system not shown in the drawings.

Although this exemplary embodiment shows a case in which the system includes one I/O device 42, the number of the I/O devices included by the system in the present invention is not limited to the abovementioned number.

Further, although this exemplary embodiment shows a case that each of the computer's I/O-bus-and-network bridge 14a and the enclosure' I/O-bus-and-network bridge 41 receives one I/O packet, the respective bridges can also receive a group of I/O packets.

Furthermore, PCIe is an example of the I/O bus that connects the bridge 12a and the computer's I/O-bus-and-network bridge 14a and the I/O bus that connects the enclosure's I/O-bus-and-network bridge 41 and the I/O device 42.

According to the system of this exemplary embodiment described above, each of the I/O-bus-and-network bridges receives an I/O packet previously defined as a control packet and, without encapsulating, transmits as a network packet notifying control of the computer or the I/O device to the system manager. Upon reception of this packet, the system manager 3 controls the computer or the I/O device. With such a configuration, it is possible to realize functions, such as stop/restart of a computer that is not defined by the I/O packet and change of allocation of the I/O device to a computer, through communication by the I/O bus.

Second Exemplary Embodiment

Next, a second exemplary embodiment of the present invention will be described with reference to FIGS. 6 and 7. This exemplary embodiment shows one specific example of the first exemplary embodiment described above.

Figure 6:
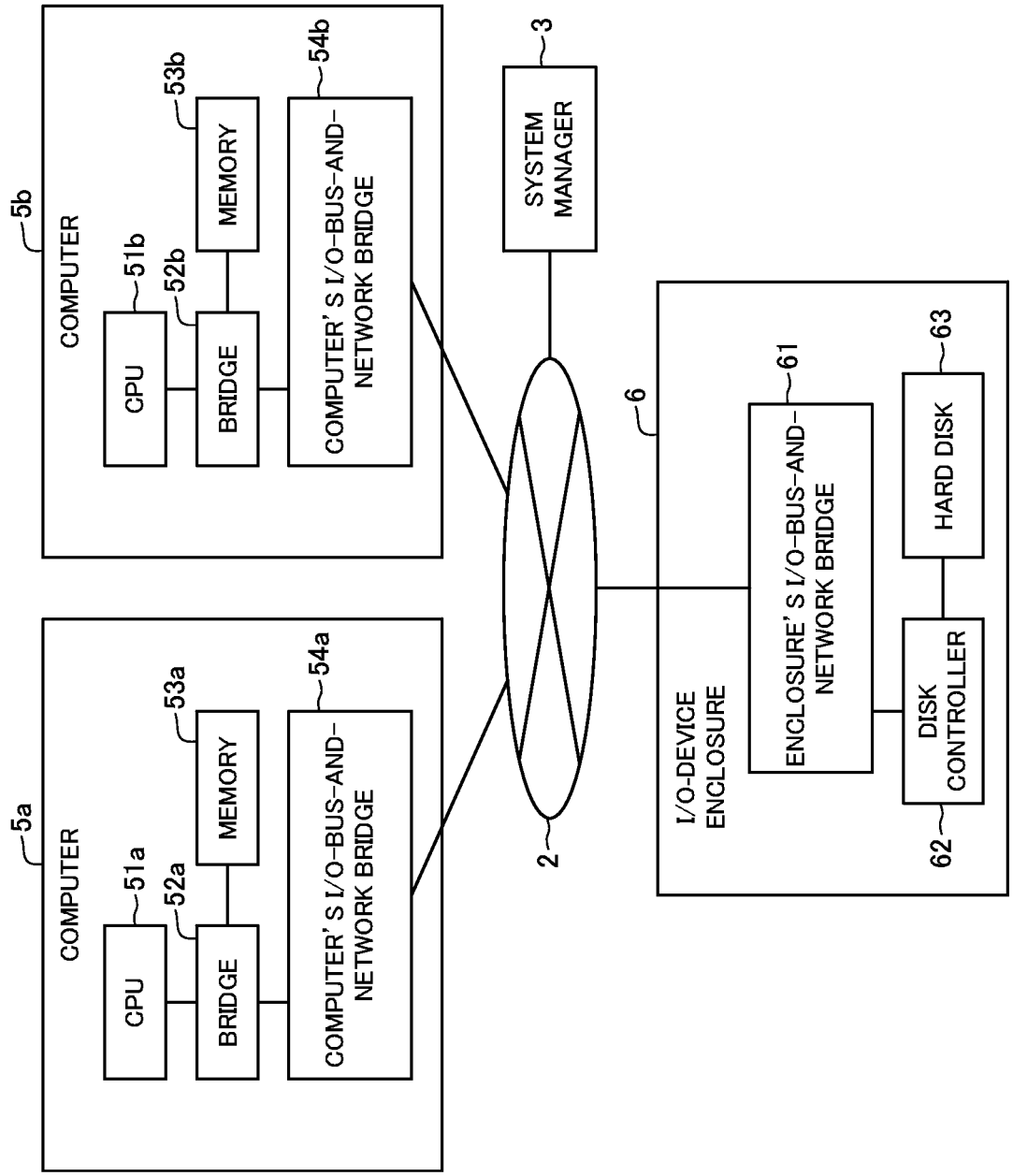
FIG. 6 is a block diagram showing the configuration of a network system in a second exemplary embodiment of the present invention.

As shown in FIG. 6, a network expansion system in this exemplary embodiment includes two computers 5a and 5b, an IO-device enclosure 6, and a system manager 3, which are connected via a network, as in the first exemplary embodiment described above. The respective computers 5a and 5b include the same components 51a to 54a and 51b to 54b as those of the computers in the first exemplary embodiment. Moreover, the system manager 3 in this exemplary embodiment has the same configuration as described in the first exemplary embodiment.

The IO-device enclosure 6 in this exemplary embodiment includes an enclosure's I/O-bus-and-network bridge as in the first exemplary embodiment, and also includes a disk controller 62 and a hard disk 63 controlled by the disk controller 62, as the I/O device 42.

FIG. 7 shows a detailed configuration of the computer's I/O-bus-and-network bridge 54a included by the computer 5a. This computer's I/O-bus-and-network bridge 54a includes, as in the first exemplary embodiment, an I/O-packet transferring unit 541a, an I/O-device control processing unit 542a, an encapsulating/decapsulating unit 543a, and a network-packet transferring unit 544a. The I/O-device control processing unit 542a includes an I/O-packet identifying unit 5421a, a storage device control calculating unit 5422a, and a control notification packet generating unit 5424a. The storage device control calculating unit 5422a has the same function as the I/O-device control calculating unit 1422 in the first exemplary embodiment.

The network system having the abovementioned configuration operates in the following manner. First, the combination of the disk controller 62 and the hard disk 63 is allocated to the computer 5a. When a failure occurs in the computer 5a, a program running on the CPU 51a runs while writing data for relaying to the computer 5b serving as an auxiliary system into the hard disk 63.

An I/O-device control program running on the CPU 51a transmits an alive-monitoring I/O packet (control auxiliary data) at every fixed time to the computer's I/O-bus-and-network bridge 54a. In the computer's I/O-bus-and-network bridge 54a, the I/O-packet transferring unit 541a judges the received I/O packet to be an I/O-device control packet, and transfers to the I/O-packet identifying unit 5421a. The I/O-packet identifying unit 5421a identifies the received I/O packet as an alive-monitoring packet, and notifies to the storage device control calculating unit 5422a.

In this case, the storage device control calculating unit 5422a, which drives a timer for I/O device switching control, resets the timer upon reception of an alive-monitoring packet. In a case that an alive-monitoring packet is not received from the I/O-device control program for a fixed time, the timer driven by the storage device control calculating unit 5422a times out, and the storage device control calculating unit 5422a transmits notification of transmission of a control notification packet for changing allocation of the I/O device, to the control notification packet generating unit 5424a. Then, on receipt of this notification, the control notification packet generating unit 5424a notifies the system manager 3 to change allocation of the combination of the disk controller 62 and the hard disk 63 from the computer 5a to the computer 5b.

The system manager 3 transmits a control packet to the enclosure's I/O-bus-and-network bridge 41, thereby switching allocation of the I/O device. In this operation, data stored in the hard disk 63 is relayed from the computer 5a in which a software fault has occurred to the auxiliary computer 5b.

Third Exemplary Embodiment

Next, a third exemplary embodiment of the present invention will be described with reference to FIG. 8. This exemplary embodiment shows one specific example of the exemplary embodiment described above.

As shown in FIG. 8, a system in this exemplary embodiment has basically the same configuration as in the first exemplary embodiment. However, as shown in FIG. 8, the system includes a keyboard 72 as one specific example of the I/O device 42 in the first exemplary embodiment. Moreover, the system manager 3 and the computer 1a are connected by a management network 8. The detailed configuration of the enclosure's I/O-bus-and-network bridge 71 is as shown in FIG. 3.

With the configuration as described above, the system in this exemplary embodiment operates in the following manner. Hereinafter, a case of stopping or restarting the computer 1a through input by a predetermined keyboard 72 will be considered.

First, when a key for stop or reset of the computer 1a determined on the keyboard 72 is pressed, the keyboard 72 transmits an I/O packet to the enclosure's I/O-bus-and-network bridge 71. Then, the I/O-packet transferring unit 414 judges the received I/O packet to be a computer control packet, and transfers the I/O packet to the I/O-packet identifying unit 4124. The I/O-packet identifying unit 4124 identifies whether the received I/O packet shows stop of the computer 1*a* or restart of the computer 1*a*, and notifies to the computer control calculating unit 4122.

The computer control calculating unit 4122 notifies the control notification packet generating unit 4121 to transmit a control notification packet corresponding to the identified control to the system manager 3. The control notification packet generating unit 4121 generates a control notification packet and transmits to the system manager 3.

Then, the system manager 3 receives the control notification packet, and performs stop or restart of the computer 5*a* instructed by using the management network 8. Herein, stop and restart of the computer 5*a* is described, another operation of the computer 5*a* can be performed. Moreover, control on the computer 5*a* by the system manager 3 may be performed via the network 2.

<Supplementary Notes>

The whole or part of the exemplary embodiments disclosed above can be described as the following supplementary notes. Below, the outline of a network system according to the present invention will be described. However, the present invention is not limited to the following configurations.

(Supplementary Note 1)

A network system including a computer and a device connected via a network so as to be capable of transmitting and receiving data to and from each other, and also including, via the network, a system management device configured to control a state of a system including the computer and the device, wherein:

the computer and the device include, respectively, bridges configured to encapsulate transmission/reception data transmitted and received to and from each other and configured to transmit and receive the data to and from each other via the network;

each of the bridges includes a control data transmitting means for generating control data for controlling the state of the system based on control auxiliary data issued from the computer or the device and used for controlling the state of the system, and transmitting the control data to the system management device via the network; and the system management device includes a system controlling means for controlling the state of the system in accordance with the control data received thereby.

(Supplementary Note 2)

The network system according to Supplementary Note 1, wherein:

each of the bridges includes an encapsulating/decapsulating means for encapsulating the transmission/reception data transmitted thereby and terminating encapsulation of the transmission/reception data received thereby; and the control data transmitting means included by each of the bridges is configured to transmit the control data to the system management device without subjecting the control data to encapsulation by the encapsulating/decapsulating means.

(Supplementary Note 3)

The network system according to Supplementary Note 2, wherein:

each of the bridges includes a data discriminating means for discriminating whether data issued from the computer or the device is the transmission/reception data or the control auxiliary data; and the data discriminating means is configured to pass the transmission/reception data to the encapsulating/decapsulating means and pass the control auxiliary data to the control data transmitting means.

(Supplementary Note 4)

The network system according to Supplementary Note 3, wherein the control data transmitting means includes a control content identifying part for identifying a control content of the system corresponding to the control auxiliary data, a control judging part for judging whether to perform control of the control content identified by the control content identifying part based on the control auxiliary data, and a control data generating part for generating the control data in accordance with judgment by the control judging part and transmitting the control data to the system management device.

(Supplementary Note 5)

The network system according to Supplementary Note 4, wherein the control data transmitting means includes a response data transmitting part for transmitting response data to the computer or the device as a source that issues the control auxiliary data, in accordance with the judgment by the control judging part.

(Supplementary Note 6)

The network system according to any of Supplementary Notes 1 to 5, wherein the control data transmitting means is configured to generate the control data for controlling allocation of the computer to the device based on the control auxiliary data issued from the computer.

(Supplementary Note 7)

The network system according to Supplementary Note 4, wherein:

the control judging part included by the control data transmitting means is configured to judge whether the control auxiliary data issued from the computer is not received for a preset time or more; and the control data generating part included by the control data transmitting means is configured to, in a case that the control auxiliary data issued from the computer is not received for the preset time or more, generate the control data for controlling the state of the system so that allocation to the device is changed to another computer.

(Supplementary Note 8)

The network system according to any of Supplementary Notes 1 to 5, wherein the control data transmitting means is configured to generate the control data for controlling stop or restart of the computer based on the control auxiliary data issued from the device.

(Supplementary Note 9)

The network system according to any of Supplementary Notes 1 to 8, wherein the device is a PCI-Express-compatible device and data issued from the computer or the device is an I/O packet compliant with PCI Express.

(Supplementary Note 10)

A computer capable of transmitting and receiving data to and from a device connected thereto via a network, the computer including a bridge configured to encapsulate transmission/reception data transmitted and received to and from the device, and transmit and receive the data to and from the device via the network, wherein the bridge includes a control data transmitting means for, based on control auxiliary data issued from the computer, generating control data for controlling a state of a system in which the computer and the device are connected via the network, and transmitting the control data to a system management device configured to control the state of the system via the network.

(Supplementary Note 11)

The computer according to Supplementary Note 10, wherein:

the bridge includes an encapsulating/decapsulating means for encapsulating the transmission/reception data transmitted to the device and terminating encapsulation of the transmission/reception data received from the device; and the control data transmitting means included by the bridge is configured to transmit the control data to the system management device without subjecting the control data to encapsulation by the encapsulating/decapsulating means.

(Supplementary Note 12)

A computer program including instructions for causing a computer capable of transmitting and receiving data to and from a device connected thereto via a network, to realize a bridge configured to encapsulate transmission/reception data transmitted and received to and from the device, and transmit and receive the data to and from the device via the network, the computer program including instructions for causing the computer to realize that the bridge includes a control data transmitting means for, based on control auxiliary data issued from the computer, generating control data for controlling a state of a system in which the computer and the device are connected via the network, and transmitting the control data to a system management device configured to control the state of the system via the network.

(Supplementary Note 13)

The computer program according to Supplementary Note 11, including instructions for causing the computer to realize that:

the bridge includes an encapsulating/decapsulating means for encapsulating the transmission/reception data transmitted to the device and terminating encapsulation of the transmission/reception data received from the device; and the control data transmitting means included by the bridge is configured to transmit the control data to the system management device without subjecting the control data to encapsulation by the encapsulating/decapsulating means.

(Supplementary Note 14)

A network system controlling method including, by a bridge included in a computer capable of transmitting and receiving data to and from a device connected thereto via a network:

encapsulating transmission/reception data transmitted and received to and from the device, and transmitting and receiving the data to and from the device via the network; and based on control auxiliary data issued from the computer, generating control data for controlling a state of a system in which the computer and the device are connected via the network, and transmitting the control data to a system management device configured to control the state of the system via the network.

(Supplementary Note 15)

The network system controlling method according to Supplementary Note 14, including: by the bridge, encapsulating the transmission/reception data transmitted to the device and terminating encapsulation of the transmission/reception data received from the device; and transmitting the control data to the system management device without subjecting the control data to encapsulation.

(Supplementary Note 16)

A device capable of transmitting and receiving data to and from a computer connected thereto via a network, the device including a bridge configured to encapsulate transmission/reception data transmitted and received to and from the computer, and transmit and receive the data to and from the computer via the network, wherein the bridge includes a control data transmitting means for, based on control auxiliary data issued from the device, generating control data for controlling a state of a system in which the device and the computer are connected via the network, and transmitting the control data to a system management device configured to control the state of the system via the network.

(Supplementary Note 17)

The device according to Supplementary Note 16, wherein:

the bridge includes an encapsulating/decapsulating means for encapsulating the transmission/reception data transmitted to the computer and terminating encapsulation of the transmission/reception data received from the computer; and the control data transmitting means included by the bridge is configured to transmit the control data to the system management device without subjecting the control data to encapsulation by the encapsulating/decapsulating means.

(Supplementary Note 18)

A computer program including instructions for causing a device capable of transmitting and receiving data to and from a computer connected thereto via a network, to realize a bridge configured to encapsulate transmission/reception data transmitted and received to and from the computer, and transmit and receive the data to and from the computer via the network, the computer program including instructions for causing the device to realize that the bridge includes a control data transmitting means for, based on control auxiliary data issued from the device, generating control data for controlling a state of a system in which the device and the computer are connected via the network, and transmitting the control data to a system management device configured to control the state of the system via the network.

(Supplementary Note 19)

The computer program according to Supplementary Note 18, including instructions for causing the device to realize that:

the bridge includes an encapsulating/decapsulating means for encapsulating the transmission/reception data transmitted to the computer and terminating encapsulation of the transmission/reception data received from the computer; and the control data transmitting means included by the bridge is configured to transmit the control data to the system management device without subjecting the control data to encapsulation by the encapsulating/decapsulating means.

(Supplementary Note 20)

A network system controlling method including, by a bridge included in a device capable of transmitting and receiving data to and from a computer connected thereto via a network:

encapsulating transmission/reception data transmitted and received to and from the computer, and transmitting and receiving the data to and from the computer via the network; and based on control auxiliary data issued from the device, generating control data for controlling a state of a system in which the device and the computer are connected via the network, and transmitting the control data to a system management device configured to control the state of the system via the network.

(Supplementary Note 21)

The network system controlling method according to Supplementary Note 20, including, by the bridge: encapsulating the transmission/reception data transmitted to the computer and terminating encapsulation of the transmission/reception data received from the computer; and transmitting the control data to the system management device without subjecting the control data to encapsulation.

(Supplementary Note 22)

A network system controlling method in a network system that includes a computer and a device connected via a network so as to be capable of transmitting and receiving data to and from each other and also includes, via the network, a system management device configured to control a state of a system including the computer and the device, the network system controlling method including:

by respective bridges included by the computer and the device: encapsulating transmission/reception data transmitted and received to and from each other, and transmitting and receiving the data to and from each other via the network; and generating control data for controlling the state of the system based on control auxiliary data issued from the computer or the device and used for controlling the state of the system, and transmitting the control data to the system management device via the network; and by the system management device, controlling the state of the system in accordance with the control data received thereby.

(Supplementary Note 23)

The network system controlling method according to Supplementary Note 22, including, by the respective bridges: encapsulating the transmission/reception data transmitted thereby and terminating encapsulation of the transmission/reception data received thereby; and transmitting the control data to the system management device without subjecting the control data to encapsulation.

In this exemplary embodiment, a program is stored in a storage device, or recorded on a computer-readable recording medium. For example, the recording medium is a portable medium such as a flexible disk, an optical disk, a magnet-optical disk and a semiconductor memory.

Although the present invention has been described above with reference to the exemplary embodiments, the present invention is not limited to the abovementioned exemplary embodiments. The configurations and details of the present invention can be modified in various manners that can be understood by a person skilled in the art within the scope of the present invention.

The present invention is based upon and claims the benefit of priority from Japanese patent application No. 2011-051098, filed on Mar. 9, 2011, the disclosure of which is incorporated herein in its entirety by reference.

DESCRIPTION OF REFERENCE NUMERALS 1a, 1b computer
11a, 11b CPU
12a, 12b bridge
13a, 13b memory
14a, 14b computer's I/O-bus-and-network bridge
141a I/O-packet transferring unit
142a I/O-device control processing unit
1421a I/O-packet identifying unit
1422a I/O-device control calculating unit
1423a I/O-packet response processing unit
1424a control notification packet generating unit
143a encapsulating/decapsulating unit
144a network-packet transferring unit
2 network
3 system manager
4 IO-device enclosure
41 enclosure's I/O-bus-and-network bridge
411 network-packet transferring unit
412 computer control processing unit
4121 control notification packet generating unit
4122 computer control calculating unit
4123 I/O-packet response processing unit
4124 I/O-packet identifying unit
413 encapsulating/decapsulating unit
414 I/O-packet transferring unit
42 I/O device
5a, 5b computer
51a, 51b CPU
52a, 52b bridge
53a, 53b memory
54a, 54b computer's I/O-bus-and-network bridge
541a I/O-packet transferring unit
542a I/O-device control processing unit
5421a I/O-packet identifying unit
5422a storage device control calculating unit
5424a control notification packet generating unit
543a encapsulating/decapsulating unit
544a network-packet transferring unit
6 IO-device enclosure
61 enclosure's I/O-bus-and-network bridge
62 disk controller
63 hard disk
7 IO-device enclosure
71 enclosure's I/O-bus-and-network bridge
72 keyboard
8a, 8b computer
81a, 81b CPU
82a, 82b bridge
83a, 83b memory
84a, 84b computer's I/O-bus-and-network bridge
9 IO-device enclosure
91 enclosure's I/O-bus-and-network bridge
92 I/O device
30 system manager

The invention claimed is:

1. A network system comprising a computer and a device connected via a network so as to be capable of transmitting and receiving data to and from each other, and also comprising, via the network, a system management device configured to control a state of a system including the computer and the device, wherein:

the computer and the device include, respectively, bridges configured to encapsulate transmission/reception data transmitted and received to and from each other and configured to transmit and receive the data to and from each other via the network;

each of the bridges includes a control data transmitting unit for generating control data for controlling the state of the system based on control auxiliary data issued from the computer or the device and used for controlling the state of the system, and transmitting the control data to the system management device via the network; and the system management device includes a system controlling unit for controlling the state of the system in accordance with the control data received thereby, wherein:

each of the bridges includes a data discriminating unit for discriminating whether data issued from the computer or the device is the transmission/reception data or the control auxiliary data, and each of the bridges further includes an encapsulating/decapsulating unit for encapsulating the transmission/reception data transmitted thereby and terminating encapsulation of the transmission/reception data received thereby;

the data discriminating unit is configured to pass the transmission/reception data to the encapsulating/decapsulating unit and pass the control auxiliary data to the control data transmitting unit; and the control data transmitting unit included by each of the bridges in configured to generate control data for controlling the state of the system based on the control auxiliary data, and transmit the control data to the system management device without subjecting the control data to encapsulation by the encapsulating/decapsulating unit.

2. The network system according to claim 1, wherein the control data transmitting unit includes a control content identifying part for identifying a control content of the system corresponding to the control auxiliary data, a control judging part for judging whether to perform control of the control content identified by the control content identifying part based on the control auxiliary data, and a control data generating part for generating the control data in accordance with judgment by the control judging part and transmitting the control data to the system management device.

3. The network system according to claim 2, wherein the control data transmitting unit includes a response data transmitting part for transmitting response data to the computer or the device as a source that issues the control auxiliary data, in accordance with the judgment by the control judging part.

4. The network system according to claim 1, wherein the control data transmitting unit is configured to generate the control data for controlling allocation of the computer to the device based on the control auxiliary data issued from the computer.

5. The network system according to claim 2, wherein:
the control judging part included by the control data transmitting unit is configured to judge whether the control auxiliary data issued from the computer is not received for a fixed time; and
the control data generating part included by the control data transmitting unit is configured to, in a case that the control auxiliary data issued from the computer is not received for the fixed time, generate the control data for controlling the state of the system so that allocation to the device is changed to another computer.

6. The network system according to claim 1, wherein the control data transmitting unit is configured to generate the control data for controlling stop or restart of the computer based on the control auxiliary data issued from the device.

7. A computer for transmitting and receiving data to and from a device connected thereto via a network, the computer comprising:
a bridge configured to encapsulate transmission/reception data transmitted and received to and from the device, and transmit and receive the data to and from the device via the network;
a memory storing instructions;
a processor executing the instructions to realize a plurality of units comprising:
a control data transmitting unit for, based on control auxiliary data issued from the computer, generating control data for controlling a state of a system in which the computer and the device are connected via the network, and transmitting the control data to a system management device configured to control the state of the system via the network;
a data discriminating unit for discriminating whether data issued from the computer is the transmission/reception data or the control auxiliary data; and
an encapsulating/decapsulating unit for encapsulating the transmission/reception data transmitted thereby and terminating encapsulation of the transmission/reception data received thereby, wherein:

the data discriminating unit is configured to pass the transmission/reception data to the encapsulating/decapsulating unit and pass the control auxiliary data to the control data transmitting unit; and the control data transmitting unit is configured to generate control data for controlling the state of the system based on the control auxiliary data, and transmit the control data to the system management device without subjecting the control data to encapsulation by the encapsulating/decapsulating unit.

8. A device for transmitting and receiving data to and from a computer connected thereto via a network, the device comprising:
a bridge configured to encapsulate transmission/reception data transmitted and received to and from the computer, and transmit and receive the data to and from the computer via the network;
a memory storing instructions;
a processor executing the instructions to realize a plurality of units comprising:
a control data transmitting unit for, based on control auxiliary data issued from the device, generating control data for controlling a state of a system in which the device and the computer are connected via the network, and transmitting the control data to a system management device configured to control the state of the system via the network;
a data discriminating unit for discriminating whether data issued from the device is the transmission/reception data or the control auxiliary data; and
an encapsulating/decapsulating unit for encapsulating the transmission/reception data transmitted thereby and terminating encapsulation of the transmission/reception data received thereby, wherein:

the data discriminating unit is configured to pass the transmission/reception data to the encapsulating/decapsulating unit and pass the control auxiliary data to the control data transmitting unit; and the control data transmitting unit is configured to generate control data for controlling the state of the system based on the control auxiliary data, and transmit the control data to the system management device without subjecting the control data to encapsulation by the encapsulating/decapsulating unit.

9. A network system controlling method in a network system that includes a computer and a device connected via a network so as to be capable of transmitting and receiving data to and from each other and also includes, via the network, a system management device configured to control a state of a system including the computer and the device, the network system controlling method comprising:
by respective bridges included by the computer and the device: encapsulating transmission/reception data transmitted and received to and from each other, and transmitting and receiving the data to and from each other via the network; and generating control data for controlling the state of the system based on control auxiliary data issued from the computer or the device and used for controlling the state of the system, and transmitting the control data to the system management device via the network; and by the system management device, controlling the state of the system in accordance with the control data received thereby, wherein:

each of the bridges discriminates whether data issued from the computer or the device is the transmission/reception data or the control auxiliary data; and encapsulates the transmission/reception data transmitted thereby and terminating encapsulation of the transmission/reception data received thereby;

each of the bridges passes the transmission/reception data to an encapsulating/decapsulating unit and passes the control auxiliary data to a control data transmitting unit; and the control data transmitting unit is configured to generate control data for controlling the state of the system based on the control auxiliary data, and transmit the control data to the system management device without subjecting the control data to encapsulation by the encapsulating/decapsulating unit.

10. The network system according to claim 1, wherein the device is a PCI-Express-compatible device and data issued from the computer or the device is an I/O packet compliant with PCI Express.

* * * * *